United States Patent
Mayr et al.

(10) Patent No.: US 11,052,888 B2
(45) Date of Patent: Jul. 6, 2021

(54) HYDRAULIC BLOCK FOR A HYDRAULIC POWER VEHICLE BRAKING SYSTEM

(71) Applicant: Robert Bosch GmbH, Stuttgart (DE)

(72) Inventors: Matthias Mayr, Rettenberg (DE); Andreas Weh, Sulzberg (DE); Juergen Tandler, Fuessen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 16/491,206

(22) PCT Filed: Jan. 25, 2018

(86) PCT No.: PCT/EP2018/051817
§ 371 (c)(1),
(2) Date: Sep. 5, 2019

(87) PCT Pub. No.: WO2018/166687
PCT Pub. Date: Sep. 20, 2018

(65) Prior Publication Data
US 2020/0031327 A1    Jan. 30, 2020

(30) Foreign Application Priority Data
Mar. 16, 2017   (DE) .......................... 102017204407.1

(51) Int. Cl.
| | |
|---|---|
| *B60T 8/36* | (2006.01) |
| *F15B 15/14* | (2006.01) |
| *F16H 57/04* | (2010.01) |
| *F16H 61/02* | (2006.01) |
| *F16K 27/00* | (2006.01) |

(52) U.S. Cl.
CPC .......... *B60T 8/368* (2013.01); *F15B 15/1404* (2013.01); *F16H 57/0435* (2013.01); *F16H 61/0206* (2013.01); *F16K 27/003* (2013.01)

(58) Field of Classification Search
CPC .............................. B60T 8/368; B60T 8/3685
USPC ..................................... 303/DIG. 10
See application file for complete search history.

(56) References Cited

U.S. PATENT DOCUMENTS

| | | | | |
|---|---|---|---|---|
| 4,953,918 | A * | 9/1990 | Hashida | B60T 8/34 303/115.4 |
| 6,398,315 | B1 * | 6/2002 | Dinkel | B60T 8/368 303/113.1 |
| 2011/0047999 | A1 * | 3/2011 | Koyama | B60T 13/662 60/459 |
| 2014/0316866 | A1 * | 10/2014 | Rosen | G06Q 30/0263 705/14.6 |

(Continued)

FOREIGN PATENT DOCUMENTS

| | | |
|---|---|---|
| CN | 101808868 A | 8/2010 |
| CN | 104870278 A | 8/2015 |

(Continued)

OTHER PUBLICATIONS

International Search Report for PCT/EP2018/051817, dated Apr. 26, 2018.

*Primary Examiner* — Melanie Torres Williams
(74) *Attorney, Agent, or Firm* — Norton Rose Fulbright US LLP; Gerard Messina

(57) ABSTRACT

A cuboid hydraulic block for a slip-controlled hydraulic power vehicle braking system and provides applying ports for wheel brakes along a transverse side or along a longitudinal side in a large side of the hydraulic block.

10 Claims, 3 Drawing Sheets

(56) References Cited

U.S. PATENT DOCUMENTS

2015/0061361 A1     3/2015   Maruo et al.
2017/0166177 A1*   6/2017   Weh .................. B60T 17/02

FOREIGN PATENT DOCUMENTS

| CN | 104884316 | A | 9/2015 |
|----|-----------|----|--------|
| DE | 102006059924 | A1 | 6/2008 |
| DE | 102014213732 | A1 | 1/2016 |
| WO | 2012150120 | A1 | 11/2012 |
| WO | 2013023953 | A1 | 2/2013 |
| WO | 2017137135 | A1 | 8/2017 |

* cited by examiner

HYDRAULIC BLOCK FOR A HYDRAULIC POWER VEHICLE BRAKING SYSTEM

FIELD

The present invention relates to a hydraulic block for a hydraulic power vehicle braking system, in particular for a slip-controlled hydraulic power vehicle braking system.

BACKGROUND INFORMATION

Slip control systems are, for example, antilock braking systems, traction control systems, and/or vehicle dynamics control systems/electronic stability programs, for which the abbreviations ABS, TCS, VDC/ESP are common. Such slip control systems of hydraulic vehicle braking systems for passenger automobiles and motorcycles are conventional and will not be explained in greater detail here.

German Patent Application No. DE 10 2006 059 924 A1 describes a hydraulic block for a slip-controlled hydraulic muscle power or power-assisted vehicle braking system. The hydraulic block is a cuboid block made of metal, which is used for mechanical fastening and hydraulic interconnection of hydraulic components of the slip control system. Interconnection means a connection of the hydraulic components in accordance with a hydraulic circuit diagram of the slip control system. Hydraulic components are, for example, hydro-pumps, solenoid valves, check valves, hydraulic accumulators, damper chambers, and pressure sensors. The hydraulic block includes receptacles for the hydraulic components, the receptacles typically being cylindrical, usually diameter-graduated counterbores, blind holes, or via holes, into which the hydraulic components are introduced and are fastened pressure-tight by caulking. The receptacles for the hydraulic components are connected to one another by bores in the hydraulic block. An electric motor for driving the hydro-pumps and an electronic control unit for controlling the hydraulic components are attached externally to the hydraulic block. Moreover, the hydraulic block includes ports for a master brake cylinder and for wheel brakes. These are also typically cylindrical, diameter-graduated counterbores, into which connection nipples for brake lines are pressed and caulked pressure-tight or into which screwed nipples are screwed. In the latter case, the counterbores have female threads. Equipped with the hydraulic components, the hydraulic block forms the core part or in any case a core part of a slip control system. If it is connected to a master brake cylinder without brake booster, it is a hydraulic muscle power vehicle braking system and if it is connected to a master brake cylinder having, for example, a vacuum brake booster, it is a hydraulic power-assisted vehicle braking system.

PCT Application No. WO 2012/150 120 A1 describes a slip-controlled hydraulic power vehicle braking system. In this vehicle braking system, the hydraulic block also includes receptacles for hydraulic components of the slip control system and ports for wheel brakes. Instead of ports for a master brake cylinder, the conventional hydraulic block has ports for a brake fluid reservoir. The hydraulic block is not connected to a master brake cylinder, but rather the master brake cylinder is installed in a master brake cylinder bore in the hydraulic block. In addition, the conventional hydraulic block includes a power cylinder bore, in which a piston-cylinder unit for power pressure generation is installed. To generate pressure, a piston of the piston-cylinder unit is displaced by an electric motor in a cylinder of the piston-cylinder unit via a mechanical rotation/translation conversion gear unit, possibly with an interconnected mechanical reduction gear unit. PCT Application No. WO 2012/150 120 A1 shows a circuit diagram of the power vehicle braking system, the formation and boring of the hydraulic block are not described.

SUMMARY

An example hydraulic block according to the present invention is provided for a hydraulic, in particular slip-controlled power vehicle braking system. The example hydraulic block has the form of a cuboid and is made of metal in particular. It includes a master brake cylinder bore for an installation of a master brake cylinder, the installation is carried out in particular by pressing the master brake cylinder into the master brake cylinder bore. The master brake cylinder is in particular actuatable by muscle power, brake boosting may be carried out by a power actuation of the vehicle braking system. Furthermore, the hydraulic block according to the present invention includes ports for hydraulic wheel brakes of the vehicle braking systems. According to the present invention, the ports for the wheel brakes are situated on or in one of the two large sides of the cuboid hydraulic block and along a longitudinal side or along a transverse side of the hydraulic block. A port for a wheel brake may also be situated offset in the direction of an opposing longitudinal side, for example. "Along" means an arrangement of the ports in a straight line or also angled line close to the longitudinal side or the transverse side of the hydraulic block at a distance of not more than approximately one or two diameters of the port. A distance of the ports for the wheel brakes from the longitudinal side or the transverse side of the hydraulic block is in any case preferably only a fraction of its distance from a longitudinal center plane or a transverse center plane of the hydraulic block.

The hydraulic block according to the present invention is adapted to an installation situation in an engine compartment of a motor vehicle. One advantage of the hydraulic block according to the present invention is the option of being able to house it in a provided installation space or installation area in an engine compartment of a motor vehicle and be able to connect brake lines, which are laid in the engine compartment, of wheel brakes to the hydraulic block without or with only few modifications. An electronic control unit attached to the hydraulic block for controlling or regulating a power braking and for the slip control system may also be connected without modifications or with few modifications to a vehicle electrical system of the motor vehicle for power supply and to electronic components such as wheel speed sensors, acceleration sensors, and rotation sensors.

Advantageous embodiments and refinements of the present invention are described herein.

BRIEF DESCRIPTION OF THE DRAWINGS

The present invention is explained in greater detail hereafter on the basis of specific embodiments illustrated in the figures.

The figures are simplified and schematic illustrations for the understanding and explanation of the present invention.

DETAILED DESCRIPTION OF EXAMPLE EMBODIMENTS

Figure 1:
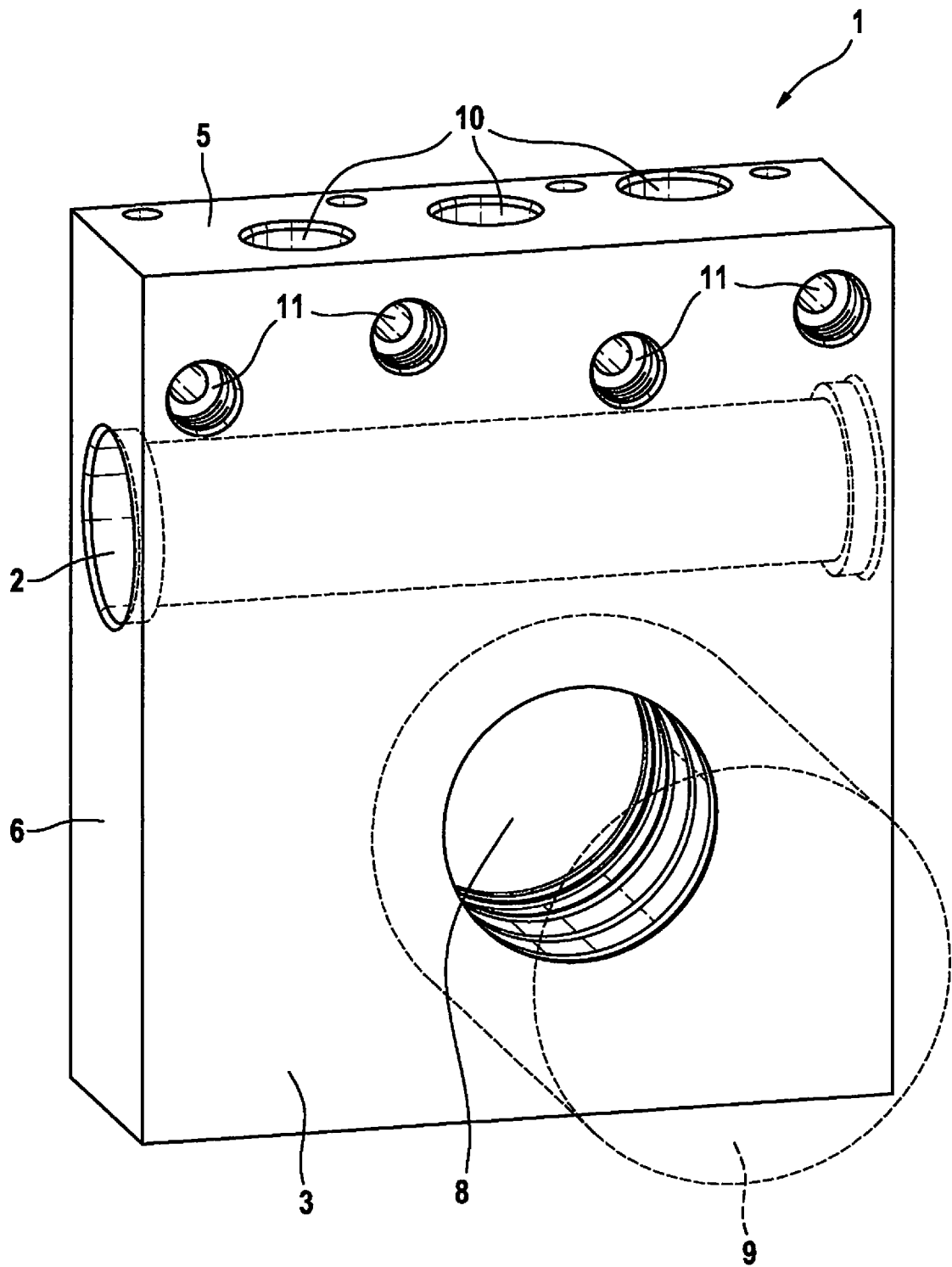
FIG. 1 shows a hydraulic block according to the present invention in a perspective view looking toward an engine side.
Figure 2:
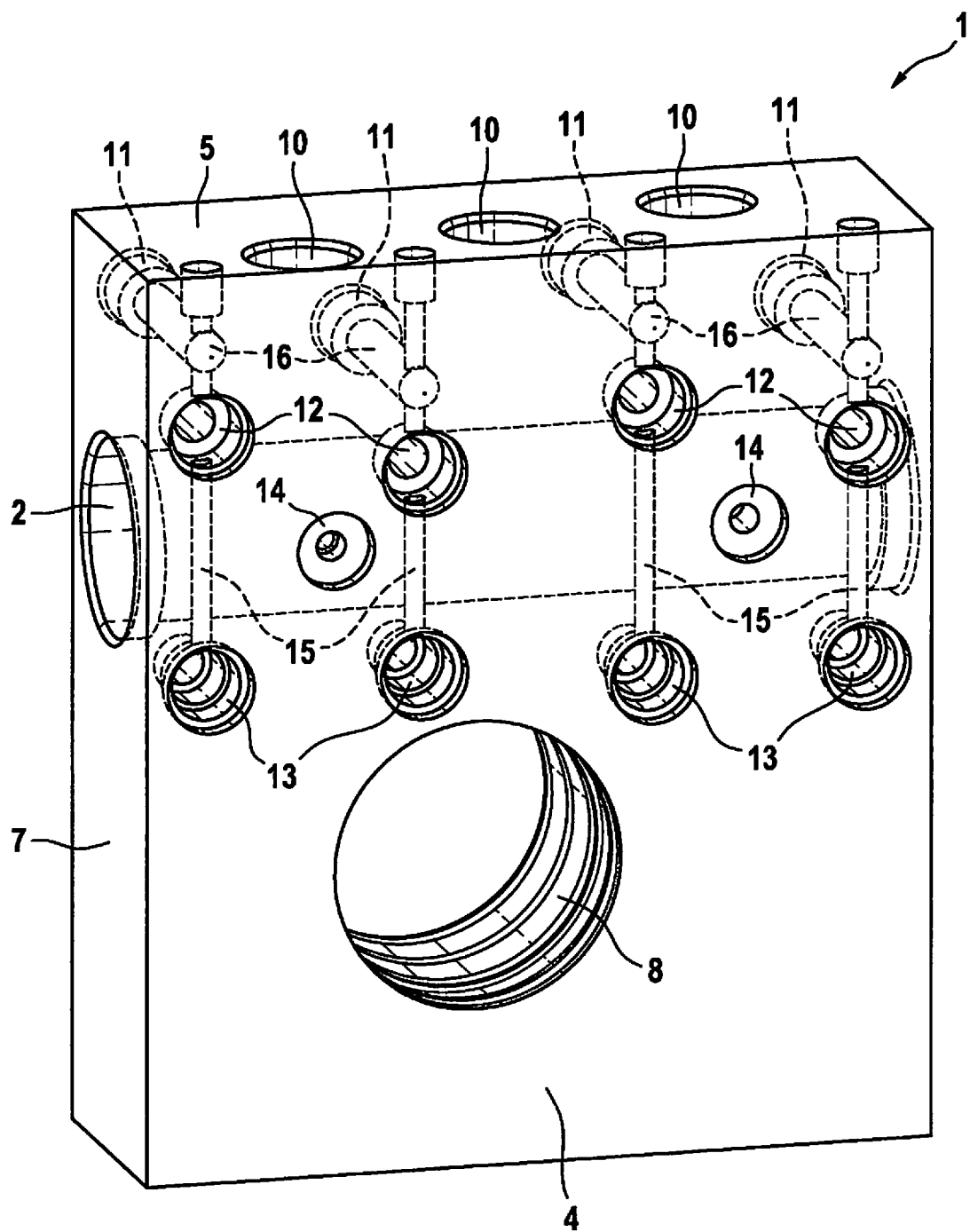
FIG. 2 shows the hydraulic block from FIG. 1 in a perspective view looking toward a valve side opposite to the engine side.

Hydraulic block 1 according to the present invention, which is shown in FIGS. 1 and 2, is provided for a hydraulic unit of a hydraulic power vehicle braking system, which includes a slip control system. The vehicle braking system itself is not shown. Slip control systems are conventional and are known, for example, as antilock braking systems, traction control systems, and/or vehicle dynamics control systems/electronic stability programs, for which the abbreviations ABS, TCS, VDC/ESP are common. They will not be explained in greater detail here.

Hydraulic block 1 is a cuboid metal block, which is longer than it is wide and wider than it is thick. It includes a master brake cylinder bore 2, which is provided for an installation of a muscle power-actuatable master brake cylinder (not shown). The master brake cylinder is pressed into master brake cylinder bore 2 and caulked pressure-tight. Master brake cylinder bore 2 extends in parallel to two large sides 3, 4 and two transverse sides 5 of hydraulic block 1 and is open on two longitudinal sides 6, 7 of hydraulic block 1. Master brake cylinder bore 2 is applied in hydraulic block 1 between a transverse center plane and one of the two transverse sides 5. In the specific embodiment of the present invention shown, master brake cylinder bore 2 is closer to the transverse center plane of hydraulic block 1 than to transverse side 5. The transverse center plane extends in a center between transverse sides 5 and in parallel to transverse sides 5.

A piston-cylinder unit (not shown) having a so-called plunger piston, which is displaceable in a power cylinder, is provided for generating brake pressure using external force. For installation of the power cylinder (not shown), hydraulic block 1 includes a power cylinder bore 8, which penetrates hydraulic block 1 from one [side] to an opposing large side 3, 4 and is open on both large sides 3, 4. Power cylinder bore 8 is applied in hydraulic block 1 close to the transverse center plane on a side of the transverse center plane opposite to master brake cylinder bore 2 and offset laterally somewhat in relation to a longitudinal center plane of hydraulic block 1. The longitudinal center plane extends in a middle between and in parallel to longitudinal sides 6, 7 of hydraulic block 1. The power cylinder (not shown) is pressed into power cylinder bore 8 and caulked pressure-tight.

An electric motor is provided as pump motor 9 for a displacement of the plunger piston (not shown) in the power cylinder, which displaces the plunger piston in the power cylinder via a planetary gear as a reduction gear unit and a worm gear. Pump motor 9 is indicated by dashed lines in FIG. 1, it is fastened coaxially in relation to power cylinder bore 8 externally on one of the two large sides 3, 4 of hydraulic block 1. Large side 3 may also be referred to as an engine side of hydraulic block 1.

In a transverse side 5, hydraulic block 1 includes ports 10 for an unpressurized brake fluid reservoir (not shown). Ports 10 are blind holes in transverse side 5 of hydraulic block 1, into which complementary, cylindrical port connecting pieces of the brake fluid reservoir are inserted, which are sealed using sealing rings in ports 10 and mechanically hold the brake fluid reservoir on transverse side 5 of hydraulic block 1.

Hydraulic block 1 is provided for upright installation in an engine compartment of a motor vehicle, i.e., transverse side 5 having ports 10 for the brake fluid reservoir is located on top and longitudinal sides 6, 7 and large sides 3, 4 extend vertically. Hydraulic block 1 may also be installed somewhat inclined, so that longitudinal sides 6, 7 and large sides 3, 4 extend at acute angles in relation to vertical planes.

Hydraulic block 1 includes ports 11 for hydraulic wheel brakes (not shown) in large side 3, which is provided for the fastening of pump motor 9. Ports 11 are cylindrical blind holes including female threads for a connection of brake lines, which lead to wheel brakes, using screwed nipples. Ports 11 without female threads for pressing in press nipples are also possible, for example. Ports 11 are situated on an imaginary line along transverse side 5 with ports 10 for the brake fluid reservoir in large side 3 of hydraulic block 1. The line on which ports 11 for the wheel brakes are situated may be linear and extend in parallel to transverse side 5, in the specific embodiment of the present invention shown in FIGS. 1 and 2, the line is slightly angled at an angle of approximately 160° to 170° to ports 11. A distance of ports 11 from transverse side 5 of hydraulic block 1 is not greater than twice or at most 2.5 times its diameter, which may also be understood as the arrangement of ports 11 close to transverse side 5. Ports 11 for the wheel brakes are located outside an area of large side 3 of hydraulic block 1 covered by pump motor 9.

Hydraulic block 1 includes receptacles 12, 13, 14 for solenoid valves, check valves, hydraulic accumulators, damper chambers, pressure sensors, and similar hydraulic components of the slip control system, which are not all shown for the sake of clarity. Receptacles 12, 13, 14 are cylindrical blind holes and cylindrical counterbores, into which the components (not shown) are pressed and caulked pressure-tight.

Hydraulic block 1 includes receptacles 12 for inlet valves, receptacles 13 for outlet valves, and receptacles 14 for pressure sensors of the slip control system in large side 4, which is opposite to large side 3, which is provided for fastening pump motor 9. The inlet valves and the outlet valves are solenoid valves. Receptacles 12, 13 for the inlet valves and for the outlet valves are situated along master brake cylinder bore 2 in large side 4 of hydraulic block 1, specifically receptacles 12 for the inlet valves are applied on one side and receptacles 13 for the outlet valves are applied on an opposing side of master brake cylinder bore 2 in large side 4 of hydraulic block 1 viewed perpendicularly in relation to large side 4 of hydraulic block 1. Viewed perpendicularly to large side 4, receptacles 12, 13 for the inlet valves and the outlet valves may overlap master brake cylinder bore 2, however, they are sufficiently short that they do not open into master brake cylinder bore 2. In each case one receptacle 12 for an inlet valve is connected to an associated receptacle 13 for an outlet valve by a connecting bore 15. Connecting bores 15, which are shown by dashed lines in FIG. 2, extend in parallel to large sides 3, 4 and in parallel to longitudinal sides 6, 7 of hydraulic block 1 between master brake cylinder bore 2 and large side 4, which includes receptacles 12, 13 for the inlet valves and the outlet valves. Port bores 16, perpendicular to large sides 3, 4, each connect a receptacle 12 for an inlet valve and a receptacle 13 for an outlet valve to a port 11 for a wheel brake via connecting bores 15.

Hydraulic block 1 is provided for a two-circuit vehicle braking system having four wheel brakes and therefore includes four ports 11 for wheel brakes, four receptacles 12 for inlet valves, and four receptacles 13 for outlet valves.

Hydraulic block 1 is bored in a Cartesian manner, i.e., in parallel and perpendicular in relation to its sides 3, 4, 5, 6, 7 and edges, it being possible to have individual inclined bores. Ports 10, 11 for the brake fluid reservoir and the wheel brakes, ports 12, 13, 14 for the components of the slip control system, master brake cylinder 2, and power cylinder bore 8 are connected to one another in accordance with a hydraulic circuit diagram of the slip control system by boring hydraulic block 1. The bores in hydraulic block 1 are manufactured by machining, but do not have to be bored, but rather may also be milled or also manufactured without machining, for example.

Figure 3:
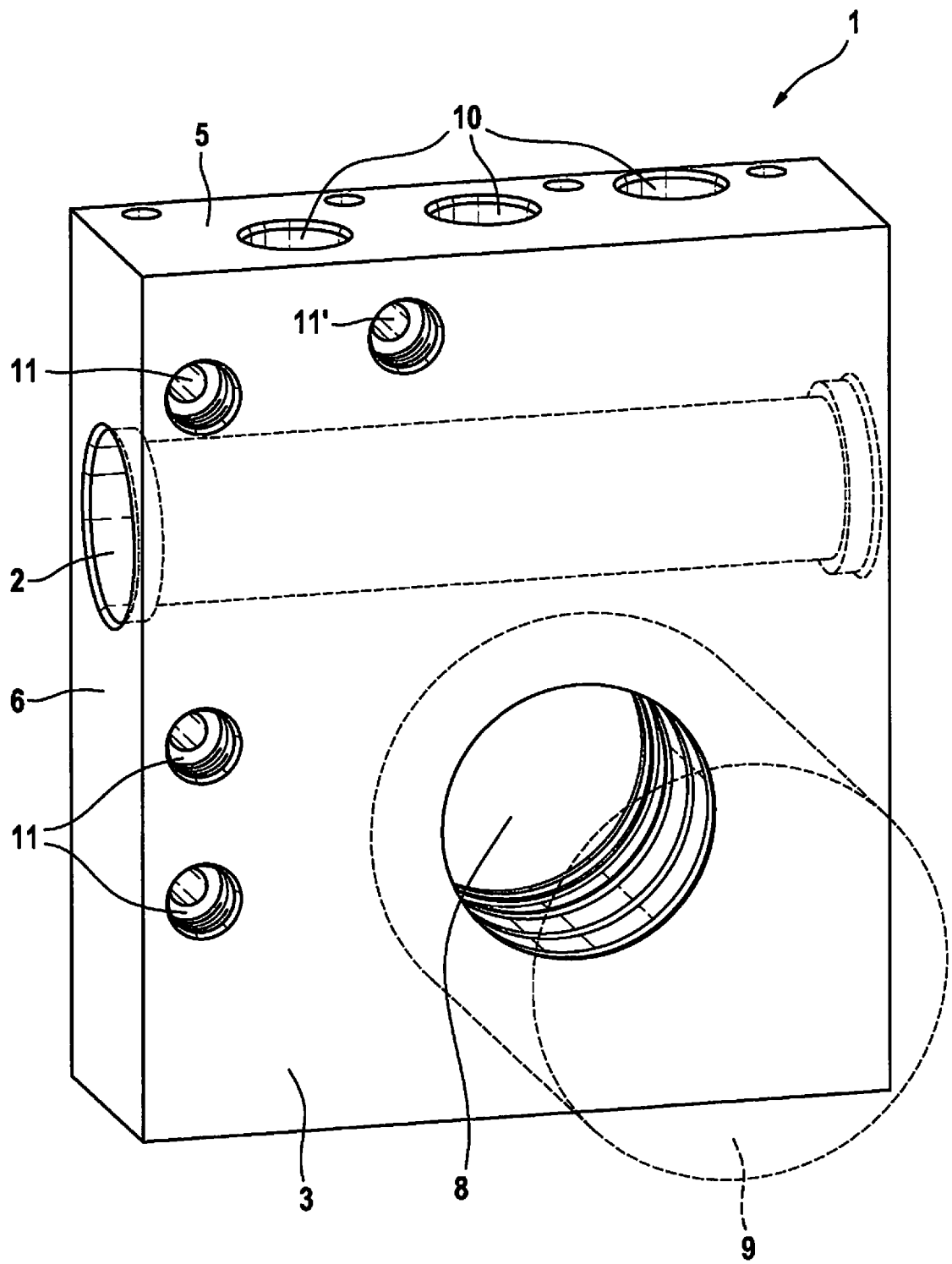
FIG. 3 shows a modified specific embodiment of a hydraulic block according to the present invention having a viewing direction corresponding to FIG. 1.

In hydraulic block 1 according to the present invention shown in FIG. 3, three ports 11 for wheel brakes are situated along one of the two longitudinal sides 6 instead of along a transverse side 5. A fourth port 11' for a wheel brake is situated close to transverse side 5 including ports 10 for the brake fluid reservoir and offset in relation to the opposing longitudinal side. Fourth port 11' is located close to the longitudinal center plane of hydraulic block 1 and on the same side of the longitudinal center plane as the other three ports 11 for the wheel brakes. Otherwise, hydraulic block 1 from FIG. 3 is formed identically to hydraulic block 1 from FIGS. 1 and 2, so that reference may be made to the statements on FIGS. 1 and 2 to avoid repetitions with respect to FIG. 3. Reference numerals are used correspondingly in all figures.

What is claimed is:

1. A cuboid hydraulic block for a hydraulic power vehicle braking system, the hydraulic block including a master brake cylinder bore and ports for hydraulic wheel brakes, wherein the ports for the hydraulic wheel brakes are situated on a large side of the hydraulic block along a longitudinal side or along a transverse side of the hydraulic block; and
wherein the ports for the wheel brakes are situated in the large side of the hydraulic block along the longitudinal side of the hydraulic block and a port for a wheel brake is situated offset in a direction of an opposing longitudinal side of the hydraulic block on the transverse side of the hydraulic block.

2. The hydraulic block as recited in claim 1, wherein the large side of the hydraulic block on which the ports for the wheel brakes are situated, is provided for attaching an electric motor for power braking, and the ports for the wheel brakes are situated between the electric motor and a longitudinal side or a transverse side of the hydraulic block.

3. The hydraulic block as recited in claim 1, wherein the hydraulic block includes a port for a brake fluid reservoir on a transverse side.

4. The hydraulic block as recited in claim 1, wherein the hydraulic block includes a power cylinder bore in the large side on which the ports for the wheel brakes are situated.

5. The hydraulic block as recited in claim 4, wherein the master brake cylinder bore is situated in the hydraulic block in parallel to transverse sides and large sides of the hydraulic block and between the power cylinder bore and a transverse side of the hydraulic block.

6. The hydraulic block as recited in claim 1, wherein the hydraulic block includes receptacles for solenoid valves of a slip control system of the vehicle braking system on a large side opposite to the large side which includes the ports for the wheel brakes.

7. A cuboid hydraulic block for a hydraulic power vehicle braking system, the hydraulic block including a master brake cylinder bore and ports for hydraulic wheel brakes, wherein the ports for the hydraulic wheel brakes are situated on a large side of the hydraulic block along a longitudinal side or along a transverse side of the hydraulic block, wherein the hydraulic block includes receptacles for solenoid valves of a slip control system of the vehicle braking system on a large side opposite to the large side which includes the ports for the wheel brakes, and wherein the hydraulic block includes a receptacle for an inlet valve of the slip control system and a receptacle for an outlet valve of the slip control system on the large side which includes the ports for the wheel brakes, opposite to the large side which are situated on both sides of the master brake cylinder bore viewed perpendicularly in relation to the large side.

8. The hydraulic block as recited in claim 7, wherein the ports for the wheel brakes are situated in the large side of the hydraulic block along the longitudinal side of the hydraulic block and a port for a wheel brake is situated offset in a direction of an opposing longitudinal side of the hydraulic block on the transverse side of the hydraulic block.

9. The hydraulic block as recited in claim 7, wherein the receptacles for the inlet valve and the outlet valve are connected by a connecting bore, which goes through between the master brake cylinder and a large side of the hydraulic block.

10. The hydraulic block as recited in claim 9, wherein the connecting bore of the receptacles for the inlet valve and the outlet valve is connected by a port bore perpendicular to the large sides of the hydraulic block to one of the ports for the wheel brakes.

\* \* \* \* \*